United States Patent
Karlsson (10) Patent No.: US 10,955,432 B2
(45) Date of Patent: Mar. 23, 2021

(54) CENTRIFUGAL SEPARATOR HAVING A SYSTEM FOR DETECTING ROTATION

(71) Applicant: ALFA LAVAL CORPORATE AB, Lund (SE)

(72) Inventor: Per Karlsson, Hägersten (SE)

(73) Assignee: ALFA LAVAL CORPORATE AB, Lund (SE)

(*) Notice: Subject to any disclaimer, the term of this patent is extended or adjusted under 35 U.S.C. 154(b) by 641 days.

(21) Appl. No.: 15/561,848

(22) PCT Filed: Mar. 21, 2016

(86) PCT No.: PCT/EP2016/056134
§ 371 (c)(1),
(2) Date: Sep. 26, 2017

(87) PCT Pub. No.: WO2016/156087
PCT Pub. Date: Oct. 6, 2016

(65) Prior Publication Data
US 2018/0120341 A1    May 3, 2018

(30) Foreign Application Priority Data
Mar. 27, 2015 (EP) .................................... 15161254

(51) Int. Cl.
*G01P 3/487* (2006.01)
*G01P 13/04* (2006.01)
(Continued)

(52) U.S. Cl.
CPC ................ *G01P 3/487* (2013.01); *B04B 5/12* (2013.01); *B04B 9/10* (2013.01); *B04B 11/02* (2013.01);
(Continued)

(58) Field of Classification Search
CPC .......... G01P 3/487; G01P 13/04; G01P 3/481; G01P 3/488; G01P 13/045; B04B 11/02; B04B 9/10; B04B 5/12; B04B 2005/125
(Continued)

(56) References Cited

U.S. PATENT DOCUMENTS

| 3,576,435 A | 4/1971 | Ehret |
| 6,512,366 B2 | 1/2003 | Siess |

(Continued)

FOREIGN PATENT DOCUMENTS

| CN | 101203319 A | 6/2008 |
| CN | 103561872 A | 2/2014 |

(Continued)

OTHER PUBLICATIONS

Chinese Office Action and Search Report for Chinese Application No. 201680018651.0, dated May 22, 2019.
(Continued)

*Primary Examiner* — Walter D. Griffin
*Assistant Examiner* — Shuyi S. Liu
(74) *Attorney, Agent, or Firm* — Birch, Stewart, Kolasch & Birch, LLP (57) ABSTRACT

A centrifugal separator includes a frame and a drive member configured to rotate a rotating part in relation to the frame around an axis of rotation. The rotating part includes a spindle and a centrifuge rotor enclosing a separation space. The rotating part is supported by the frame by at least one bearing device. The centrifugal separator further includes a system for detecting rotation of the rotating part. The system includes at least one first type of sector each occupying a first length of the perimeter of a member arranged for rotation with the rotating part, and at least one second type of sector each occupying a second length of the perimeter of the member arranged for rotation. The at least one second type of sector is spaced apart from the at least one first type of sector. The second length is different compared to the first length. The at least one first and second types of sectors are irregularly spaced around the perimeter of the member arranged for rotation. The system further includes an inductive sensor arranged to detect the at least one first and second
(Continued)

types of sectors and give rise to a binary pulse sequence upon rotation of the member arranged for rotation. The temporal widths of the binary pulses correspond to the lengths of the at least one first and the at least one second types of sectors, respectively.

18 Claims, 4 Drawing Sheets

(51) Int. Cl.
    *G01P 3/488*     (2006.01)
    *G01P 3/481*     (2006.01)
    *B04B 5/12*     (2006.01)
    *B04B 9/10*     (2006.01)
    *B04B 11/02*     (2006.01)

(52) U.S. Cl.
    CPC .............. *G01P 3/481* (2013.01); *G01P 3/488* (2013.01); *G01P 13/04* (2013.01); *G01P 13/045* (2013.01); *B04B 2005/125* (2013.01)

(58) Field of Classification Search
    USPC ................... 73/514.39; 324/207.25; 494/10
    See application file for complete search history.

(56) References Cited

U.S. PATENT DOCUMENTS

| | | | |
|---|---|---|---|
| 6,721,385 B2 | 4/2004 | Siess et al. | |
| 7,432,495 B2 | 10/2008 | Baumann | |
| 7,874,972 B2 | 1/2011 | Hayasaka et al. | |
| 2009/0025562 A1* | 1/2009 | Hallgren | B01D 45/14 96/216 |
| 2009/0102467 A1* | 4/2009 | Snell | G01D 5/145 324/207.25 |
| 2010/0316503 A1 | 12/2010 | Knudsen et al. | |
| 2013/0129481 A1 | 5/2013 | Tamminen et al. | |
| 2013/0145847 A1* | 6/2013 | Martin | G01P 3/487 73/514.39 |

FOREIGN PATENT DOCUMENTS

| | | |
|---|---|---|
| DE | 32 47 174 A1 | 6/1984 |
| DE | 44 28 396 A1 | 2/1996 |
| DE | 19847328 A1 | 7/1999 |
| DE | 198 14 758 A1 | 10/1999 |
| DE | 101 33 381 A1 | 1/2003 |
| EP | 0560391 A2 | 9/1993 |
| EP | 0 377 481 B1 | 9/1994 |
| EP | 2 602 627 A1 | 6/2013 |
| JP | 56-160613 A | 12/1981 |
| JP | 6-170281 A | 6/1994 |
| WO | WO 2006/132577 A1 | 12/2006 |
| WO | WO 2012/158093 A1 | 11/2012 |

OTHER PUBLICATIONS

European Office Action for European Application No. 15161254.6, dated Feb. 1, 2018.
International Search Report, issued in PCT/EP2016/056134, dated Sep. 16, 2016.
Written Opinion of the International Searching Authority, issued in PCT/EP2016/056134, dated Sep. 16, 2016.

* cited by examiner

CENTRIFUGAL SEPARATOR HAVING A SYSTEM FOR DETECTING ROTATION

FIELD OF THE INVENTION

The present invention relates to the field of detecting rotational speed and/or direction, and more particularly for a system for detection of rotational speed and/or rotational direction in a centrifugal separator.

BACKGROUND OF THE INVENTION

Centrifugal separators are generally used for separation of liquids and/or for separation of solids from a liquid. During operation, liquid mixture to be separated is introduced into a rotating bowl and heavy particles or denser liquid, usually water, accumulates at the periphery of the rotating bowl whereas less dense liquid accumulates closer to the central axis of rotation. This allows for collection of the separated fractions, e.g. by means of different outlets arranged at the periphery and close to the rotational axis, respectively.

It is advantageous to be able to measure both the rotational speed and the rotational direction of the rotor of the centrifugal separator. This may be for safety reasons and for analysing the performance of the separator. Since the rotor is arranged in a frame, visual inspection is not possible and therefore, different systems for detecting rotation are used instead.

Today, rather complicated measurement systems are used. This increases the risk of electrically connecting equipment of the measurement system, such as sensors etc., in a wrong way which in turn increases the risk of monitoring the rotational speed and/or the rotational direction in a wrong way.

However, there is a need in the art for simplified systems for detecting rotation, such a rotational speed and rotational direction.

SUMMARY OF THE INVENTION

An object with the present invention is to provide a centrifugal separator in which the rotational speed and the rotational direction of the rotor of the centrifugal separator may conveniently be measured.

As a first aspect of the invention, there is provided a centrifugal separator comprising
a frame,
a drive member configured to rotate a rotating part in relation to the frame around an axis of rotation (x); wherein the rotating part comprises a spindle and a centrifuge rotor enclosing a separation space, said rotating part being supported by the frame by at least one bearing device,
wherein the centrifugal separator further comprises a system for detecting rotation of said rotating part, said system comprising
at least one first type of sector each occupying a first length of the perimeter of a member arranged for rotation with said rotating part,
at least one second type of sector each occupying a second length of the perimeter of said member arranged for rotation, wherein the at least one second type of sector is spaced apart from said at least one first type of sector, and
wherein the second length is different compared to said first length, and said at least one first and second types sectors are irregularly spaced around the perimeter of said member arranged for rotation,
and wherein the system further comprises
an inductive sensor arranged to detect said at least one first and second types of sectors and give rise to a binary pulse sequence upon rotation of said member arranged for rotation, and wherein the temporal widths of the binary pulses correspond to the lengths of said at least one first and said at least one second types of sectors, respectively.

The centrifugal separator is for separation of a fluid mixture, such as a gas mixture or a liquid mixture. The frame of the centrifugal separator is a non-rotating part, and the rotating part is supported by the frame by at least one bearing device, which may comprise a ball bearing. As an example, the bearing device may comprise at least one ball-bearing, such as at least two ball-bearings, attached to the spindle. The bearing device may thus support the spindle. The at least one bearing device may thus be attached or connected to the outer surface of the spindle.

The rotating part of the separator comprises a centrifuge rotor and a spindle. The centrifuge rotor encloses by rotor walls a separation space in which the separation of the fluid mixture takes place. The separation space may comprise a stack of separation discs, such as a stack of frustoconical separation discs. The separator also comprises an inlet for fluid to be separated and at least one outlet for fluid that has been separated.

The drive member for rotating the rotating part of the separator may comprise an electrical motor having a rotor and a stator. The rotor may be fixedly connected to the rotating part. Advantageously, the rotor of the electrical motor may be provided on or fixed to the spindle of the rotating part. Alternatively, the drive member may be provided beside the spindle and rotate the rotating part by a suitable transmission, such as a belt or a gear transmission.

The centrifuge rotor is supported by a spindle, i.e. a rotating shaft, and is thus mounted to rotate with the spindle. The spindle is thus rotatable around the axis of rotation. The centrifugal separator may be arranged such that the centrifuge rotor is supported by the spindle at one of its ends, such at the bottom end or the top end of the rotor.

In the present disclosure, "radially" refers to the radial direction from the rotating axis, and "axially" means in the direction along the rotating axis.

The system for detecting rotation thus facilitates a convenient way of measuring the rotational direction and/or the rotational speed of the rotating part of the centrifugal separator.

The detection of rotation may be detecting rotation direction, such as clockwise or anti-clockwise direction, and/or rotational speed, i.e. as revolutions per minute (rpm).

The member arranged for rotation further comprises at least one first type of sector and at least one second type sector. Each first type of sector occupies a first length and each of the second type of sector occupies a second length. The first types of sectors hence differ from the second types of sectors in that they occupy different lengths of the perimeter of the member arranged for rotation. The perimeter of the member arranged for rotation. is at the radial distance at which the sensor of the system detects the signal from the sectors. The perimeter may thus be the circumference of the member arranged for rotation, such as the circumference of a disc.

The first types of sectors may also differ from the second types of sectors in that they occupy a different area of the disc. The first and second type of sector should thus differ at the regions which are detected by the sensor.

The member arranged for rotation may further comprise other types of sectors, i.e. a third type of sector, a fourth type of sector etc. These types of sectors may thus occupy different lengths of the perimeter of the disc as compared to the first or second type of sectors.

An inductive sensor refers to a proximity sensor, such as an electronic proximity sensor, which detects metallic objects without touching them.

The system thus further comprises an inductive sensor for detecting the sectors. The inductive sensor is stationary and does not rotate during operation of the separator. The sensor may be arranged radially outside the member arranged for rotation or it may be arranged axially above or below the member arranged for rotation, as long as it is able to detect the first and second sectors.

The inductive sensor may comprise an inductive loop and the inductance of the loop changes in the presence of a metal. This change may be detected by sensing circuits.

The inductive sensor is arranged to work with binary signals or binary logics, meaning that it gives rise to a binary signal (1/0) signal when detecting the sectors, i.e. a pulse sequence having only two different "states" (on or off). The pulses in the pulse sequence are of equal magnitude, but have different temporal width. The pulses may be positive pulses or negative pulses. The sensor may thus be arranged in the proximity of the perimeter of the disc, so that it may detect the sector as the disc rotates. The temporal width of a pulse from a sector corresponds to the length of the sector. This means that a sector occupying a certain length of the perimeter of the disc will give rise to a binary signal with a wider temporal width compared to a sector occupying a smaller length of the disc.

Furthermore, the first and second sectors are irregularly spaced around the perimeter of the disc. This means that the first and second sectors are not rotationally symmetrically spaced around the perimeter. In other words, the sectors are arranged around the perimeter so as to give rise to a different pulse sequence from the sensor if being rotated clockwise as compared to anti-clockwise rotation.

Since the sectors are spaced apart from each other, this further means that the disc also comprises portions around the perimeter that is not occupied with a sector, i.e. portions that will not be detected by the sensor. These portions thus correspond to the time intervals in the detected pulse sequence in which the sensor signal has no magnitude The first aspect of the invention is based on the insight that a system for detection rotation as described above is particularly advantageous in use in a centrifugal separator. This is because the centrifugal separator requires high grade materials and one wants to avoid using magnetic materials within the separator, i.e. one wants to avoid the risk of collecting metallic debris at the rotating parts of the separator. With the use of an inductive sensor, magnetic objects are not necessary within the separator. Furthermore, a sensor using binary logics may be used if the member arranged for rotation comprises sectors as discussed above. In this way, analysis of the pulse sequence from the binary sensor may be used to detect both the rotational speed and the rotational direction. The signal from the binary sensor is easier to evaluate compared to e.g. an analogue sensor.

In embodiments of the first aspect of the invention, the member arranged for rotation is a disc arranged around said spindle.

The disc may be arranged around the spindle. The disc of the system may thus be centred on the rotating axis, such as centred on the spindle, or it may be arranged on an axis that is substantially perpendicular to the rotational axis, such as on a horizontal axis for transmitting torque to the spindle, if the spindle is a vertical axis The rotational axis as discussed in relation to the first aspect above may thus be the rotational axis X of the separator.

The disc may thus comprise a central through hole, and the disc is arranged around the spindle such that the spindle protrudes through the central through hole. The disc has thus the same centre as the spindle and may be arranged to co-rotate with the spindle around the rotational axis (X).

The disc of the system may have a round shape, or substantially a round shape, meaning that it may be round but comprising protrusions. The disc may be arranged to be centred on the rotating axis. This means that, when the system is installed on an axis to be rotated, the disc may be arranged such that the axis is perpendicular to the surface of the disc.

The disc may be a metallic disc but may also comprise or be composed of other materials, such as plastics.

Furthermore, the disc may be designed such that it prevents being mechanically installed in e.g. separator with the wrong side facing upwards. This may for example be achieved by having a mechanical marks or features on the disc such that it only fits around the rotational axis with the "right" side facing upwards. In this way, it is possible to easily and safely detect the way the axis turns. The design of the disc further makes it possible to install the system for detecting rotation of the rotor in e.g. existing centrifugal separators.

In embodiments of the first aspect of the invention the system comprises a single inductive sensor.

This means that the system may be free of other sensors for detecting the sectors. By having only a single sensor decreases the risk of coupling the sensor in a non-working way compared to when using e.g. two binary sensors, which may be electrically coupled in several different ways.

However, the system may also comprise more than one sensor.

As an example, the sectors may protrude more in the axial direction as compared to the other portions of the disc.

Thus, both the first and the second type of sectors may protrude more in the axial direction as compared to the other portions of the disc. Thus, the surface of the disc may have different height, wherein the heights of the sectors are higher than the other surface of the disc. The sensor may then be arranged axially above the surface of the disc so as to detect the different heights on the surface of the disc.

Of course, the opposite is also possible, i.e. an embodiment in which the portions of the disc that is not a sector protrudes more than the sector portions.

As an example, the sectors of the disc have a larger radius compared to the other portions of the disc.

Thus, both the first and the second type of sectors may have a larger radius compared to the other portions of the disc. A sector may thus be a portion of the disc having a larger radius compared to the portions of the disc that are not detected by the sensor. This makes it easy to manufacture the disc and also facilitates the use of an inductive or proximity sensor, as discussed below.

In embodiments of the first aspect of the invention, the sectors are openings or through holes in the disc. The sectors may also have a radius that is smaller compared to the other portions of the disc. Thus, a sector may be a recess or an opening in the disc. The sensor may then be arranged e.g. to give rise a pulse, such as a negative pulse, when detecting a sector as the absence of an object close to the sensor.

As an example, the at least one first type of sector may be of the same material as the at least one second type of sector. Thus, the disc may be of a single material, such as a single metallic material. The disc may have a uniform conductivity throughout the disc, i.e. the first and second sectors may be of material having the same conductivity. Thus, this facilitates manufacturing of the disc, if the disc is of a single material.

However, the sectors of the disc may also be of a different material as compared to the other portions of the disc. The sectors may for example be metallic whereas the other portions are non-metallic.

In embodiments of the first aspect of the invention, the disc comprises a single first type of sector and a single second type of sector.

In other words, the disc may comprise a single sector of the first type and a single sector of the second type, and the two sectors differ in that they occupy a different length of the perimeter of the disc. This makes it possible to have a simple disc design which simplifies the analysis of the binary pulse sequence.

The disc may be arranged around the spindle at the bearing devices. For example, the centrifugal separator may comprise a top bearing and a bottom bearing and the disc, as well as the sensor, may be arranged around the spindle at the top bearing. The top bearing may be arranged closer to the rotor as compared to the bottom bearing.

Thus, in embodiments of the first aspect of the invention, the spindle is supported by at least one bottom bearing and at least one top bearing and the top bearing is arranged closer to the centrifuge rotor as compared to the bottom bearing, and wherein the disc is located at the top bearing and the inductive sensor is located radially outside the disc.

In embodiments of the second aspect of the invention, the member arranged for rotation is an axis of the rotating part of the centrifugal separator. The member arranged for rotation may thus be the spindle.

Hence, the spindle may comprise sectors as protrusions, holes, or voids, on the surface that is detected as sectors by the sensor. The sectors may thus be of the same material as the spindle.

As a second aspect of the invention, there is provided a system for detecting rotation of a rotating axis, said system comprising
  a disc arranged to rotate with said rotating axis and
    comprising
  at least one first type of sector each occupying a first
    length of the perimeter of said disc,
  at least one second type of sector each occupying a second
    length of the perimeter of said disc, wherein the at least
    one second type of sector is spaced apart from said at
    least one first type of sector, and
  wherein the second length is different compared to said
    first length, and said at least one first and second types
    sectors are irregularly spaced around the perimeter of
    said disc,
  and wherein the system further comprises
  an inductive sensor arranged to detect said at least one
    first and second types of sectors and give rise to a
    binary pulse sequence upon rotation of said disc, and
    wherein the temporal widths of the binary pulses correspond to the lengths of said at least one first and said
    at least one second types of sectors, respectively.

The terms and definitions used in relation to the second aspect of the invention are a discussed in relation to the first aspect above.

The system according to the second aspect of the invention is for detecting rotation of an axis, such as a shaft or spindle. The axis may be a rotating axis of e.g. a centrifugal separator.

In a configuration of the second aspect of the invention, there is provided a system for detecting rotation of a rotating axis, said system comprising
  an axis arranged for rotation,
  at least one first type of sector each occupying a first
    length of the perimeter of said axis,
  at least one second type of sector each occupying a second
    length of the perimeter of said axis, wherein the at least
    one second type of sector is spaced apart from said at
    least one first type of sector, and
  wherein the second length is different compared to said
    first length, and said at least one first and second types
    sectors are irregularly spaced around the perimeter of
    said axis,
  and wherein the system further comprises
  an inductive sensor arranged to detect said at least one
    first and second types of sectors and give rise to a
    binary pulse sequence upon rotation of said axis, and
    wherein the temporal widths of the binary pulses correspond to the lengths of said at least one first and said
    at least one second types of sectors, respectively.

Thus, the sectors may be arranged directly, e.g. as protrusions, holes, or voids, on the surface of the axis arranged for rotation, i.e. the axis of which the system is intended to measure the rotational speed and/or the rotational direction.

As a third aspect of the invention, there is provided disc for a system for detecting the rotation direction of a rotating axis, said disc comprising
  at least one first type of sector each occupying a first
    length of the perimeter of said disc,
  at least one second type of sector each occupying a second
    length of the perimeter of said disc, wherein the at least
    one second type of sector is spaced apart from said at
    least one first type of sector, and
  wherein the second length is different compared to said
    first length, and said at least one first and second types
    sectors are irregularly spaced around the perimeter of
    said disc, and wherein the sectors of the disc have a
    larger radius compared to the other portions of the disc,
    and
  a through hole adapted for a rotating axis.

The terms and definitions used in relation to the third aspect of the invention are a discussed in relation to the other aspects above.

The disc according to the second aspect of the invention may thus be used in the system to the first aspect above.

As a fourth aspect of the invention, there is provided a method for detecting the rotational speed of a centrifugal separator comprising the steps of:
  a) providing a centrifugal separator according to any one
    of claims 1-8;
  b) rotating said rotating part of said separator and recording the binary pulse sequence from said sensor;
  c) detecting a repetitive pattern in said binary pulse
    sequence and calculating the time for the disc and
    rotating part of the separator to rotate a full turn as the
    time of a cycle in the repetitive pattern; and
  d) using the time of a cycle calculated in step c) for
    calculating the rotational speed of the separator.

The terms and definitions used in relation to the fourth aspect of the invention are a discussed in relation to the other aspects above. The fourth aspect thus provides a method of how to determine the rotational speed of the separator, i.e. the rotor of the separator. The binary pulse sequence generated is detected and analysed to find a repetitive pattern. Upon rotation of the disc, the pulse sequence has a repetitive pattern with cycles that corresponds to a full turn of the disc, i.e. a full turn of the axis upon which the disc is arranged. Thus, a cycle is the pulse sequence generated during a full turn of the disc. By calculating the time between cycles, the time for a full turn is generated and this may then by simple calculations be used for calculating the rotational speed expressed e.g. as rpm.

The steps of calculating the time for a cycle and calculating the rotational speed may be performed by a computer program product comprising computer readable code.

Step c) may for example comprise determining the temporal width for each pulse and comparing this with the time for a full turn in order to determine if the pulse originates from a first type of sector or a second type of sector.

In embodiments of the fourth aspect of the invention, the disc of the separator of step a) comprises a single first type of sector and a single second type of sector and step c) comprises calculating the time between every second pulse in the binary pulse sequence.

Thus, by having only a single first type of sector and a single of the second type of sector, the analysis of the generated pulse sequence is simplified, since such a sector only give rise to two o different types of pulses during a full turn, i.e. the cycle in the repetitive pattern consists of two pulses and the time for a full turn of the disc is the time between every second pulse. This is further shown in the detailed description below.

As a fifth aspect of the invention, there is provided method for detecting the rotational direction of a rotating part of a centrifugal separator comprising the steps of
a) providing a centrifugal separator according to the first aspect above;
b) rotating said rotating part of said separator and recording the binary pulse sequence from said sensor;
c) comparing the pulse sequence from step b) with the shape of the disc to conclude the rotational direction of the rotating part of the centrifugal separator.

The terms and definitions used in relation to the fifth aspect of the invention are a discussed in relation to the other aspects above. The fifth aspect thus provides a method of how to determine the rotational direction of the separator.

Step c) may for example comprise determining the temporal width for each pulse and comparing this with the time for a full turn in order to determine if the pulse originates from a first type of sector or a second type of sector.

By knowing the shape of the disc, i.e. the sequence of the sectors around the perimeter of the disc, and how it is mounted in the separator, e.g. which surface is facing "upwards" in the axial direction, one may by analysing the pulse sequence and the order in which the pulses appear in the pulse sequence determine the rotational direction. This step may be performed by a computer program product comprising computer readable code. Such a program may thus compare the pulse sequence with predetermined pulse sequences in order to determine the rotational direction of the disc.

BRIEF DESCRIPTION OF THE DRAWINGS

FIG. 3 a-d show examples of detected pulse sequence from the disc of the system of FIG. 2.

DETAILED DESCRIPTION

The system for detecting rotation as well as a centrifugal separator according to the present disclosure will be further illustrated by the following description with reference to the accompanying drawings.

Figure 1:
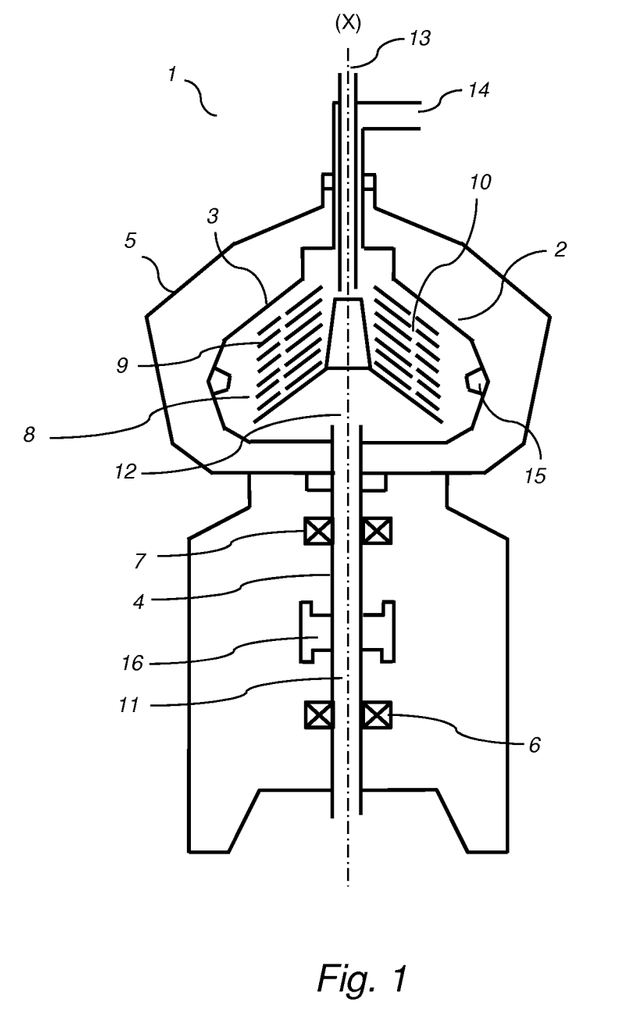
FIG. 1 shows a schematic illustration of a cross-section of a centrifugal separator in which the system for detecting rotation may be arranged.

The centrifugal separator 1 comprises a rotating part 2 arranged for rotation about an axis of rotation (X) and comprises rotor 3 and spindle 4. The spindle 4 is supported in the frame 5 of the centrifugal separator in a bottom bearing 6 and a top bearing 7.

The rotor 3 forms within itself a separation chamber 8 in which centrifugal separation of e.g. a liquid mixture to takes place during operation. The centrifugal separator 1 is in this embodiment of a so called hermetic type with a closed separation space 8, i.e. the separation space 8 is intended to be completely filled with liquid during operation. In principle, this means that preferably no air or free liquid surfaces is meant to be present within the rotor 3.

The separation chamber 8 is provided with a stack of frustoconical separation discs 9 in order to achieve effective separation of the liquid. The stack of truncated conical separation discs 9 are examples of surface-enlarging inserts. These discs 9 are fitted centrally and coaxially with the rotor and comprise holes which form channels 10 for axial flow of liquid when the separation discs 9 are fitted in the centrifugal separator 1.

A central duct 11 extends through the spindle 4, which takes the form of a hollow, tubular member. The central duct 11 forms in this embodiment an inlet channel for introducing the liquid for centrifugal separation to the inlet 12 of the rotor, and thereby providing the material to be separated to the separation space 8. Introducing the liquid material from the bottom provides a gentle acceleration of the liquid material. The spindle 4 is further connected to inlet pipes (not shown) at the bottom of the separator 1, such that liquid material to be separated may be transported to the central duct 11, e.g. by means of a pump.

The rotor 3 has extending from it a liquid light phase outlet 13 for a lower density component separated from the liquid, and a liquid heavy phase outlet 14 for a higher density component, or heavy phase, separated from the liquid. The outlets 13 and 14 extend through the frame 5. The rotor 3 is provided at its outer periphery with a set of radially sludge outlets 15 in the form of intermittently openable outlets for discharge of higher density component such as sludge or other solids in the liquid. This material is thus discharged from a radially outer portion of the separation chamber 8 to the space round the rotor 3.

The centrifugal separator 1 is further provided with a drive motor 16. This motor 16 may for example comprise a stationary element and a rotatable element, which rotatable element surrounds and is so connected to the spindle 4 that during operation it transmits driving torque to the spindle 4 and hence to the rotor 3. The drive motor 16 may be an electric motor. Furthermore, the drive motor 16 may be connected to the spindle 4 by transmission means. The transmission means may be in the form of a worm gear which comprises a pinion and an element connected to the spindle 4 in order to receive driving torque. The transmission means may alternatively take the form of a propeller shaft, drive belts or the like, and the drive motor may alternatively be connected directly to the spindle.

During operation of the separator in FIG. 1, the rotor 3 is caused to rotate by torque transmitted from the drive motor 16 to the spindle 4. Via the central duct 11 of the spindle 4, liquid material to be separated is brought into the separation space 8. In the hermetic type of inlet the acceleration of the liquid material is initiated at a small radius and is gradually increased while the liquid leaves the inlet and enters the separation space 8. However, liquid may also be introduced when the rotor is already running at its operational speed. Liquid material may thus be continuously introduced into the rotor 3.

Depending on the density, different phases in the liquid is separated between the separation discs 9 fitted in the separation space 8. Heavier components in the liquid move radially outwards between the separation discs, whereas the phase of lowest density moves radially inwards between the separation discs and is forced through outlet 13 arranged at the radial innermost level in the separator. The liquid of higher density is instead forced out through outlet 14 that is at a radial distance that is larger than the radial level of outlet 13. Thus, during separation, an interphase between the liquid of lower density and the liquid of higher density is formed in the separation space 8. Solids, or sludge, accumulate at the periphery of the separation chamber 8 and is emptied intermittently from the separation space by the sludge outlets 15 being opened, whereupon sludge and a certain amount of fluid is discharged from the separation space by means of centrifugal force. However, the discharge of sludge may also take place continuously, in which case the sludge outlets 15 take the form of open nozzles and a certain flow of sludge and/or heavy phase is discharged continuously by means of centrifugal force.

In certain applications, the separator 1 only contains a single liquid outlet, such as only liquid outlet 13, and the sludge outlets 15. This depends on the liquid material that is to be processed.

In the embodiment of FIG. 1, the material to be separated is introduced via the central duct 11 of the spindle 4. However, the central duct 11 may also be used for withdrawing e.g. the liquid light phase and/or the liquid heavy phase. In embodiments, the central duct 11 comprises at least one additional duct. In this way, both the liquid mixture to be separated may be introduced to the rotor 3 via the central duct 11, and concurrently the liquid light phase and/or the liquid heavy phase may be withdrawn through the central duct 11.

Figure 2:
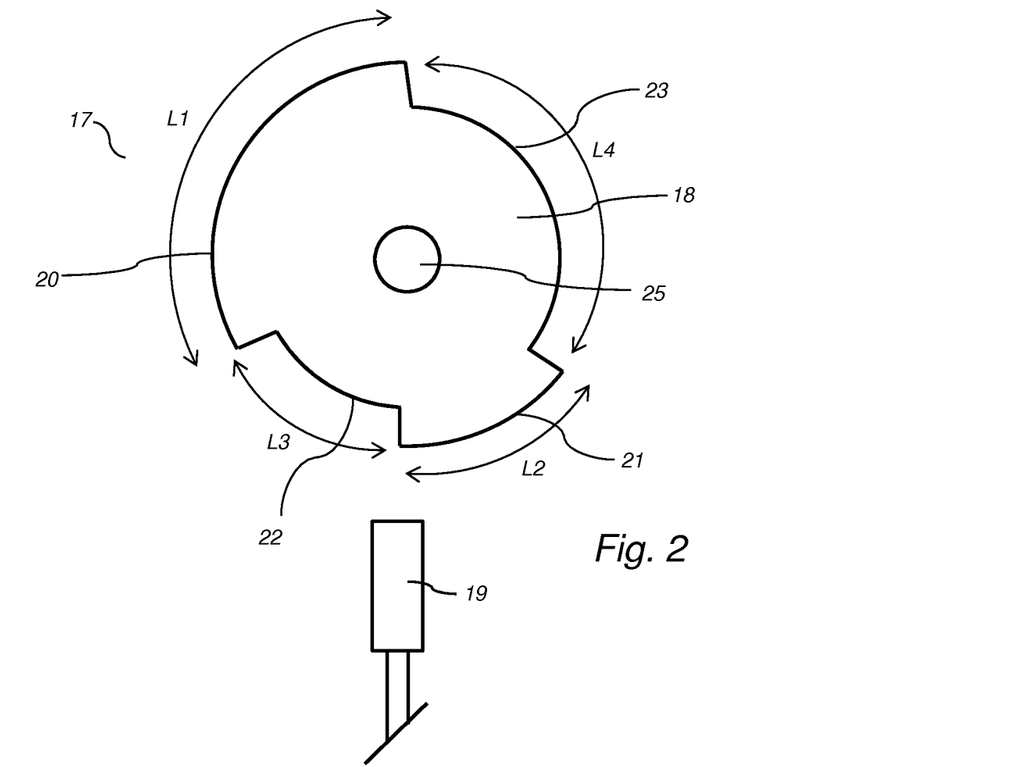
FIG. 2 shows an embodiment of a system for detecting rotation.

FIG. 2 shows an embodiment of system 17 for detecting rotation. The system 17 comprises a disc 18 and a single sensor 19. The disc may for example be arranged in the centrifugal separator 17 such that the spindle 4 extends through the through hole 25 of the disc, i.e. such that the disc rotates with the spindle 4 around the rotational axis X. The disc 18 comprises one sector 20 of a first type and one sector 21 of a second type. The sector 20 of the first type occupies a length L1 of the perimeter of the disc 18 whereas the sector 21 of the second type occupies a length L2 of the perimeter of the disc 18. In this embodiment, the length L1 is longer than the length L2. The sectors 20 and 21 are spaced from each other, meaning that portions 22 and 23 between the sectors 20 and 21 are formed around the perimeter of the disc. The sectors 20 and 21 are irregularly spaced around the perimeter, which in this case means that the length L3 of portion 22 is different from the length L4 of portion 23. The sectors 21 and 22 extend further in the radial direction from the rotational axis, i.e. from an axis extending through the hole 25, as compared to the portions 22 and 23 of the disc that has no sector.

The disc 18 is in this embodiment a metallic disc and both sectors 20, 21 and the rest of the disc are of the same metallic material.

The system further comprises an inductive sensor 19 arranged radially outside the disc 18 and sectors 21 and 22. The inductive sensor 19 gives rise to a signal in the presence of a sector 21 and 22, but no signal in the presence of a portion of the disc 22 and 23 that has no sector. Thus, the inductive sensor is a proximity sensor that gives rise to a signal when a metallic object, in this case the sectors 20, 21 of the disc 18 is in the proximity of the sensor 17. When the portions 22 and 23 of the disc 18 not comprising a sector, i.e. the portions of the disc 18 having a shorter radius compared to the sectors 20, 21, are in front of the sensor 19, the distance to the sensor is too long for the sensor 19 to give rise to a signal.

The signal from the sensor 19 is a binary signal, i.e. the pulses have the same amplitude but differ in length, and i.e. the pulses have different temporal width.

Examples on how the pulse sequences from detector 19 are shown in FIGS. 3a-c.

FIG. 3a shows a pulse sequence 24 for a full turn of disc 18 as the disc rotates clockwise in front of sensor 19. The sector 20 of the first type having length L1 gives rise to pulse P1 having temporal width ts1. The portion 22 of the disc having length L3 gives rise to no signal in the sensor during time tx1. The sector 21 of the second type having length L2 gives rise to pulse P2 having temporal width ts2. The portion 23 of the disc having length L4 gives rise to no signal in the sensor during time tx2. Thus, the temporal width of the pulses corresponds to the lengths that the sectors occupy on the perimeter of the disc. In other words, sector 20 with length L1 gives rise to a pulse P1 that has a longer temporal width compared to pulse P2, which originates from sector 21 having a shorter length L2 than L1.

FIG. 3b shows a cycle in the pulse sequence when the disc 18 rotates counter clockwise. The pulse sequence in FIG. 3b thus differs from the pulse sequence in FIG. 3a in the order that the pulse P1 and P2 appear in the pulse sequence. In the sequence of FIG. 3b, the long pulse P1 is followed by a long "dead period" originating from length L4 before the pulse P2 from sector 21 appears.

FIG. 3c shows a cycle in the pulse sequence when the disc 18 rotates clockwise, i.e. the same pulse sequence as in FIG. 3a, but starting with the short pulse P2.

FIG. 3d shows a cycle in the pulse sequence when the disc 18 rotates counter-clockwise, i.e. the same pulse sequence as in FIG. 3b, but starting with the short pulse P2.

FIGS. 3a-d thus demonstrates that a due to the irregularly spaced sectors 20 and 21, different pulse sequences will be recorded depending on the rotational direction of the disc 18.

The system described above could be arranged on a centrifugal separator as described in relation to FIG. 1. For example, the disc 18 could be arranged on the spindle 4 such that the spindle protrudes from through hole 25. The disc and system could for example be arranged above the top bearing 7 of the centrifugal separator.

Figure 4:
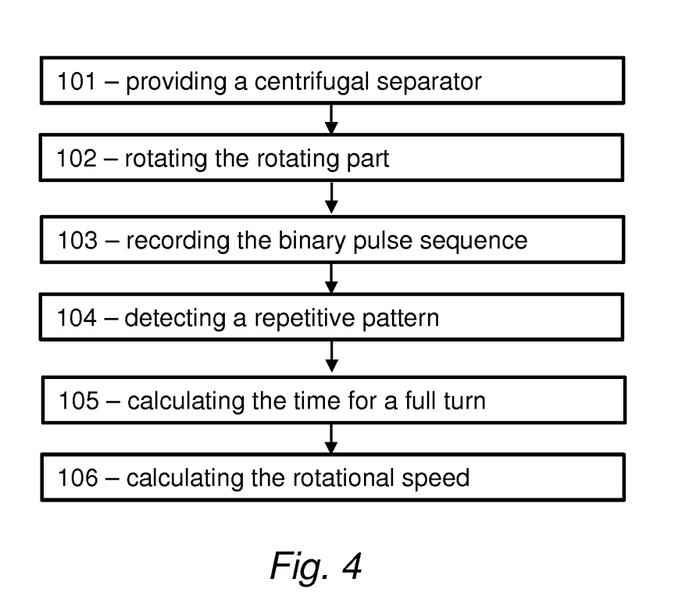
FIG. 4 schematically shows a method for determining the rotational speed of a centrifugal separator.

FIG. 4 schematically shows the method for determining the rotational speed of a centrifugal separator in which the system for detecting rotation is arranged. First, the centrifugal separator is provided at 101 and the rotating part is brought into rotation 102 by means of the drive member. The binary pulse sequence from the sensor is recorded at 103 and this sequence is analysed in order to detect 104 a repetitive pattern in the pulse sequence. The cycles of the repetitive pattern corresponds to a full turn of the disc, and hence a full turn of e.g. the spindle on which the disc is arranged. The time for a full cycle is calculated 105 and this time may be converted or calculated 106 into a rotational speed expressed as rpm.

Figure 5:
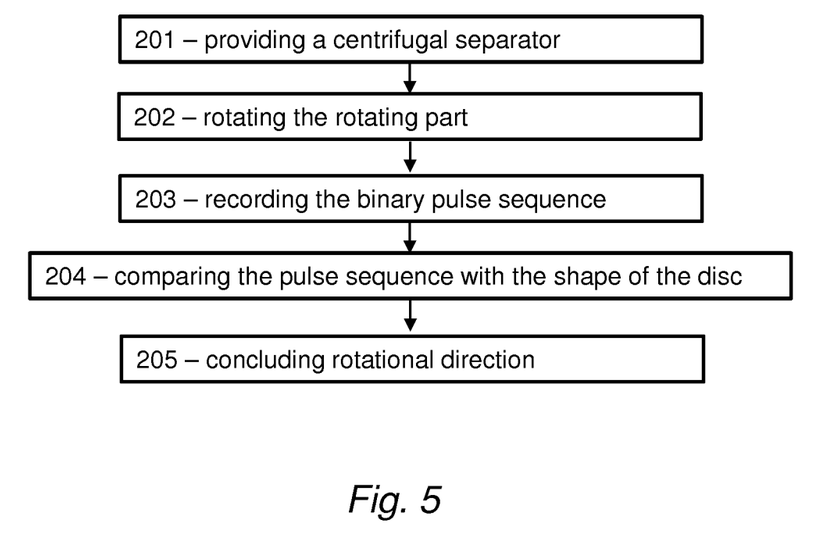
FIG. 5 schematically shows a method for determining the rotational direction of a centrifugal separator.

FIG. 5 schematically shows the method for determining the rotational direction of a centrifugal separator in which the system for detecting rotation is arranged. As in the method described in relation to FIG. 4, the centrifugal separator is provided at 201 and the rotating part is brought into rotation 202 by means of the drive member. The binary pulse sequence from the sensor is recorded at 203. The recorded pulse sequence is compared with possible pulse sequences that the specific shape of the disc may give rise to. For example, if a disc as disclosed in FIG. 2 is used, the possible pulse sequences shown in FIG. 3 a-d are possible, and the recorded pulse sequence at 203 may be compared with the possible sequences. By also knowing which surface of the disc is mounted "upwards", one may determine if the disc rotates clockwise or counter-clockwise.

In order to determine if a long or a short pulse is recorded, e.g. if pulse P1 or P2 is recorded (see FIG. 3), the time for a pulse relative the time for a full cycle may be calculated and compared with preknown values.

The steps 103, 104, 105, 106 as well as steps 203, 204 and 205 may be performed by software, i.e. a computer program product comprising computer readable code.

Figures 6, 7, 8:
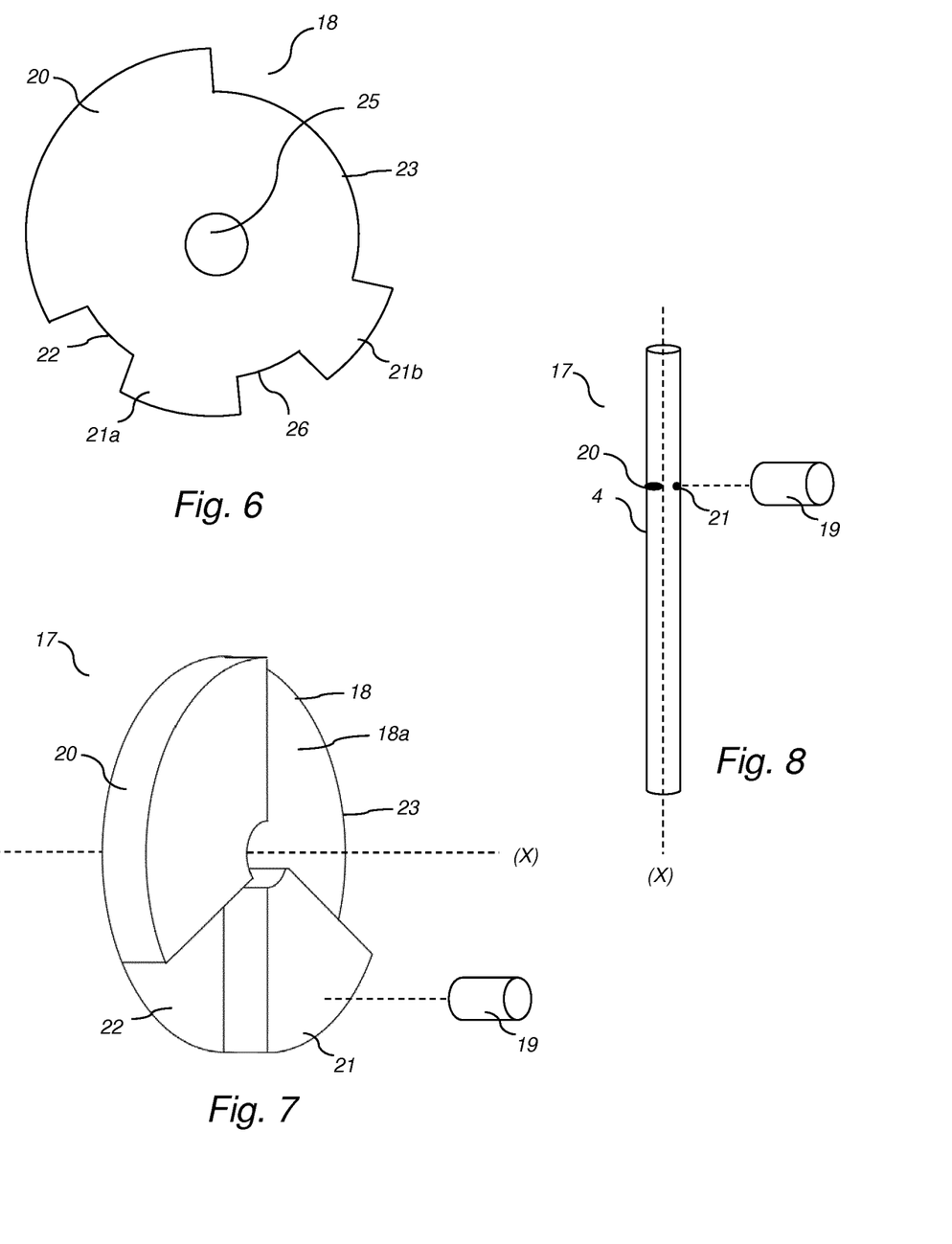
FIG. 6 shows a further embodiment of a disc that may be used in the system of the present disclosure.
FIG. 7 shows a further embodiment of a disc that may be used in the system of the present disclosure.
FIG. 8 shows an embodiment in which the sectors are arranged on the rotational axis itself.

FIG. 6 shows another embodiment of a disc 18 that may be used in the system. The disc 18 is similar to the disc as shown in FIG. 2, but differs in that it comprises two sections 21a and 21b of the second type of sector instead of only one. Thus, the disc 18 comprises a first type of sector 20 and two second type of sector 21a and 21b, and between these sectors are regions 22, 26 and 23 that have a shorter radius than the sectors. The detected pulse sequence from the disc 18 of FIG. 6 will thus be similar to the pulse sequence of FIG. 3, but also comprise an "extra" short pulse P2.

Figure 3:
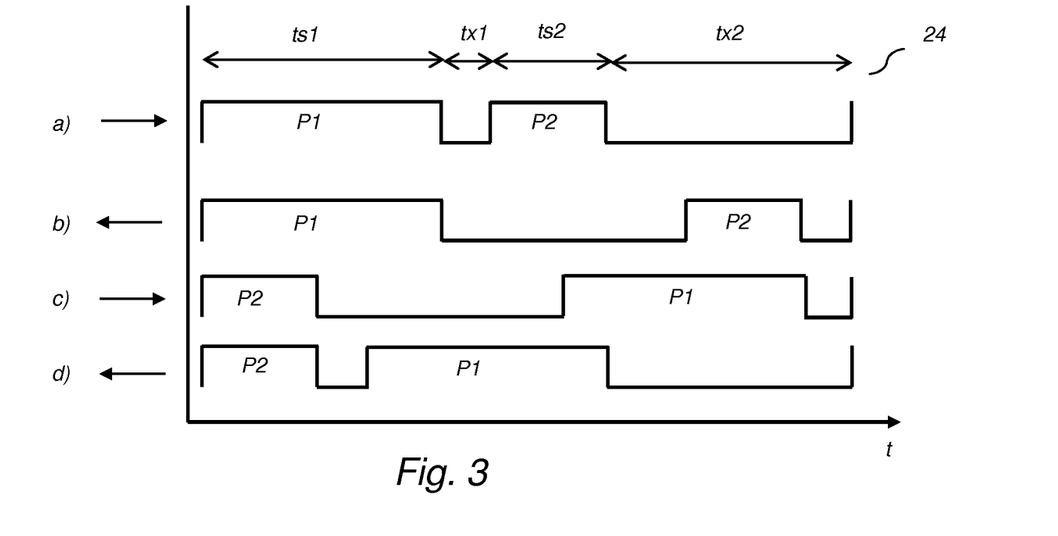

FIG. 7 shows a further embodiment of a system 17 for detecting rotation an example of a disc 18 that may be used in the system. Sectors 20 and 21 differ from the portions 22, 23 in that they extend in the axial direction, i.e. extend in the direction of the rotational axis X from the surface 18a of the disc 18. In this embodiment, a sensor 19 may be arranged axially above the extended sectors 20 and 21. Such a sensor may be an optical sensor or for example an inductive sensor as described in relation to FIG. 2 above. Similar to the earlier embodiments, the sensor 19 only gives rise to a binary pulse when a sector 20, 21 passes the sensor 19, whereas no signal is generated when the portions 22 and 23 passes the sensor 19. The possible pulse sequences detected from disc 18 of FIG. 8 would be similar to the pulse sequences as shown in FIG. 3.

FIG. 8 shows an embodiment of a system 17 in which the actual sectors 20, 21 are a part of the rotating axis, in this case the spindle 4. The sectors 20, 21 may be arranged as protrusions or as holes in the surface of the spindle 4 and arranged around the perimeter of the spindle 4 in a similar way as the sectors are arranged on the disc as discussed in relation to the other embodiments above. For example, the sectors 20, 21 may be different holes in the surface of the spindle 4, and these holes may occupy the perimeter of the spindle 4 as e.g. the sectors 20 21 occupy the perimeter of the disc 18 in FIG. 8. If the sensor 19 is an inductive sensor, such as a proximity sensor, the sector 20 and 21 may be detected as negative pulses in the pulse sequence. The rotational speed and/or rotational may be calculated from the detected pulse sequence in analogy with the previous embodiments discussed above.

The invention is not limited to the embodiment disclosed but may be varied and modified within the scope of the claims set out below. The invention is not limited to the orientation of the axis of rotation (X) disclosed in the figures. The term "centrifugal separator" also comprises centrifugal separators with a substantially horizontally oriented axis of rotation.

The invention claimed is:

1. A centrifugal separator comprising:
a frame;
a drive member configured to rotate a rotating part in relation to the frame around an axis of rotation, wherein the rotating part comprises a spindle and a centrifuge rotor enclosing a separation space, said rotating part being supported by the frame by at least one bearing device; and
a system for detecting rotation of said rotating part, said system comprising:
at least one first type of sector, each at least one first type of sector occupying a first length of a perimeter of a member arranged for rotation with said rotating part and having a distance in a radial direction;
at least one second type of sector, each at least one second type of sector occupying a second length of the perimeter of said member arranged for rotation and having a distance in the radial direction, wherein the at least one second type of sector is spaced apart from said at least one first type of sector, wherein the second length is different compared to said first length, wherein the distance in the radial direction of the at least one first type of sector and the distance in the radial direction of the at least one second type of sector are different than remaining parts of the rotating part, and wherein said at least one first and second types sectors are irregularly spaced around the perimeter of said member arranged for rotation; and
an inductive sensor arranged to detect said at least one first and second types of sectors and give rise to a binary pulse sequence upon rotation of said member arranged for rotation, and wherein the temporal widths of the binary pulses correspond to the lengths of said at least one first and said at least one second types of sectors, respectively.

2. The centrifugal separator according to claim 1, wherein the system comprises a single inductive sensor.

3. The centrifugal separator according to claim 1, wherein the member arranged for rotation is a disc arranged around said spindle.

4. The centrifugal separator according to claim 3, in which the sectors protrude more in the axial direction as compared to the other portions of the disc.

5. The centrifugal separator according to claim 3, wherein the sectors of the disc have a larger radius compared to the other portions of the disc.

6. The centrifugal separator according to claim 3, wherein the at least one first type of sector is of the same material as the at least one second type of sector.

7. The centrifugal separator according to claim 3, wherein the disc comprises a single first type of sector and a single second type of sector.

8. The centrifugal separator according to claim 3, wherein the spindle is supported by at least one bottom bearing and at least one top bearing, and the top bearing is arranged closer to the centrifuge rotor as compared to the bottom bearing, and wherein the disc is located at the top bearing and the inductive sensor is located radially outside the disc.

9. The centrifugal separator according to claim 1, wherein the member arranged for rotation is the spindle.

10. A system for detecting rotation of a rotating axis, said system comprising:

a disc arranged to rotate with said rotating axis, said disc comprising:

at least one first type of sector, each at least one first type of sector occupying a first length of a perimeter of said disc and having a distance in a radial direction; and at least one second type of sector, each at least one second type of sector occupying a second length of the perimeter of said disc and having a distance in the radial direction, wherein the at least one second type of sector is spaced apart from said at least one first type of sector, wherein the second length is different compared to said first length, wherein the distance in the radial direction of the at least one first type of sector and the distance in the radial direction of the at least one second type of sector are different than remaining parts of the disc and wherein said at least one first and second types sectors are irregularly spaced around the perimeter of said disc; and an inductive sensor arranged to detect said at least one first and second types of sectors and give rise to a binary pulse sequence upon rotation of said disc, and wherein the temporal widths of the binary pulses correspond to the lengths of said at least one first and said at least one second types of sectors, respectively.

11. A disc for a system for detecting the rotation direction of a rotating axis, said disc comprising:

at least one first type of sector, each at least one first type of sector occupying a first length of the perimeter of said disc;

at least one second type of sector, each at least one second type of sector occupying a second length of the perimeter of said disc, wherein the at least one second type of sector is spaced apart from said at least one first type of sector, wherein the second length is different compared to said first length, wherein said at least one first and second types sectors are irregularly spaced around the perimeter of said disc, and wherein the sectors of the disc have a larger radius compared to the other portions of the disc;

a through hole adapted for the rotating axis; and an inductive sensor arranged to detect said at least one first and second types of sectors and give rise to a binary pulse sequence upon rotation of said shaft, and wherein the temporal widths of the binary pulses correspond to the lengths of said at least one first and said at least one second types of sectors, respectively.

12. A method for detecting the rotational speed of a centrifugal separator comprising the steps of:

a) providing the centrifugal separator according to claim 1;

b) rotating said rotating part of said separator and recording the binary pulse sequence from said sensor;

c) detecting a repetitive pattern in said binary pulse sequence and calculating the time for the disc and rotating part of the separator to rotate a full turn as the time of a cycle in the repetitive pattern; and d) using the time of a cycle calculated in step c) for calculating the rotational speed of the separator.

13. The method according to claim 12, wherein the disc of the separator of step a) comprises a single first type of sector and a single second type of sector and step c) comprises calculating the time between every second pulse in the binary pulse sequence.

14. A method for detecting the rotational direction of a rotating part of a centrifugal separator comprising the steps of:

a) providing the centrifugal separator according to claim 1;

b) rotating said rotating part of said separator and recording the binary pulse sequence from said sensor; and c) comparing the pulse sequence from step b) with the shape of the member to conclude the rotational direction of the rotating part of the centrifugal separator.

15. The centrifugal separator according to claim 2, wherein the member arranged for rotation is a disc arranged around said spindle.

16. The centrifugal separator according to claim 4, wherein the at least one first type of sector is of the same material as the at least one second type of sector.

17. The centrifugal separator according to claim 5, wherein the at least one first type of sector is of the same material as the at least one second type of sector.

18. The centrifugal separator according to claim 4, wherein the disc comprises a single first type of sector and a single second type of sector.

* * * * *